United States Patent [19]
Cesano

[11] Patent Number: 5,641,379
[45] Date of Patent: Jun. 24, 1997

[54] APPARATUS FOR PRODUCING A THERMOPLASTIC ARTICLE HAVING AN UNDERCUT CROSS-SECTION

[76] Inventor: Franco Cesano, Via Brusiti 13 bis, I-10060 San Secondo Di Pinerolo (Torino), Italy

[21] Appl. No.: 557,182
[22] PCT Filed: Apr. 18, 1994
[86] PCT No.: PCT/IT94/00046
    § 371 Date: Dec. 13, 1995
    § 102(e) Date: Dec. 13, 1995
[87] PCT Pub. No.: WO95/28272
    PCT Pub. Date: Oct. 26, 1995
[51] Int. Cl.$^6$ .................................................. B32B 31/20
[52] U.S. Cl. .................... 156/580; 156/227; 156/583.1
[58] Field of Search .................................. 156/212, 213, 156/216, 221, 223, 227, 580, 581, 583.1

[56] References Cited

U.S. PATENT DOCUMENTS 5,080,742  1/1992  Takahashi .......................... 156/212
5,201,981  4/1993  Whiteside .......................... 156/212
5,324,384  6/1994  Spengler .......................... 156/581

FOREIGN PATENT DOCUMENTS 0495292   7/1992   European Pat. Off. .
2424805   11/1979  France .
WO90/02645  3/1990  WIPO .

Primary Examiner—James Sells
Attorney, Agent, or Firm—Sughrue, Mion, Zinn, Macpeak & Seas

[57] ABSTRACT

The equipment comprises a molding element (16) having a working surface (18) against which a previously-heated sheet (12) of thermoplastic material is urged. The equipment comprises at least one movable element for defining a cavity (38) with an undercut cross section which, in use, encloses a portion of the sheet (12) to be molded and compressed-air supply means (36) which brings about the deformation of at least one portion of the sheet (12) by means of a jet of compressed air.

4 Claims, 6 Drawing Sheets

5,641,379

APPARATUS FOR PRODUCING A THERMOPLASTIC ARTICLE HAVING AN UNDERCUT CROSS-SECTION

BACKGROUND OF THE INVENTION

The present invention relates to equipment for producing an article made of thermoplastic material and having an undercut cross-section, particularly for internal linings for motor vehicles, such as an internal door-lining panel or a vehicle door-handle integral with the lining panel or fixable thereto.

Although the invention has been developed with particular reference to components for the internal fittings of motor vehicles, it is not intended to be limited to this field and can be used whenever it is desired to produce a component having an undercut cross section and composed of a sheet of thermoplastic material which may be covered and which is shaped by thermal compression-moulding.

In the specific field of the moulding of sheets of thermoplastic material, considerable difficulties are encountered in the production of the dies when a component with an undercut cross-section is to be produced. In fact, the conventional technique for the thermal compression-moulding of sheets of thermoplastic material consists of compressing the sheet to be moulded between the shaping surfaces of two moulding elements, which involves the need to form the moulding elements with movable portions in order to produce projections which are disposed at angles of less than 90° to the direction of the relative movement of the moulding elements.

SUMMARY OF THE INVENTION

In older to overcome the aforementioned problems, the subject of the present invention is equipment for producing a component of a thermoplastic material and having an undercut cross-section, particularly a handle for motor-vehicle doors, comprising a first moulding element having a working surface the shape of which corresponds to a portion of an outer surface of the component when completed; a second moulding element having a shaping surface which, in a moulding operation, is spaced from the working surface of the first moulding element by a distance substantially corresponding to a thickness of the thermoplastic material; a pair of sliders, at least one of the sliders being disposed in slidable engagement with the first moulding element and defining a cavity having a working shaping surface, the slider being movable from an inoperative position wherein the cavity is spaced from the working surface of the first moulding element, to an operative position wherein the surface of the cavity is a continuation of the working surface of the first moulding element; and a compressed-air supply means carried by the second moulding element, for directing jets of compressed air against the edges of the thermoplastic material to deform the edges thereof and force them into the cavity to provide an undercut cross-section to the component upon completion of the moulding operation.

BRIEF DESCRIPTION OF THE DRAWINGS

The present invention will now be described in detail with reference to the appended drawings, provided purely by way of non-limiting example, in which.

DESCRIPTION OF THE PREFERRED EMBODIMENTS

Figure 1:
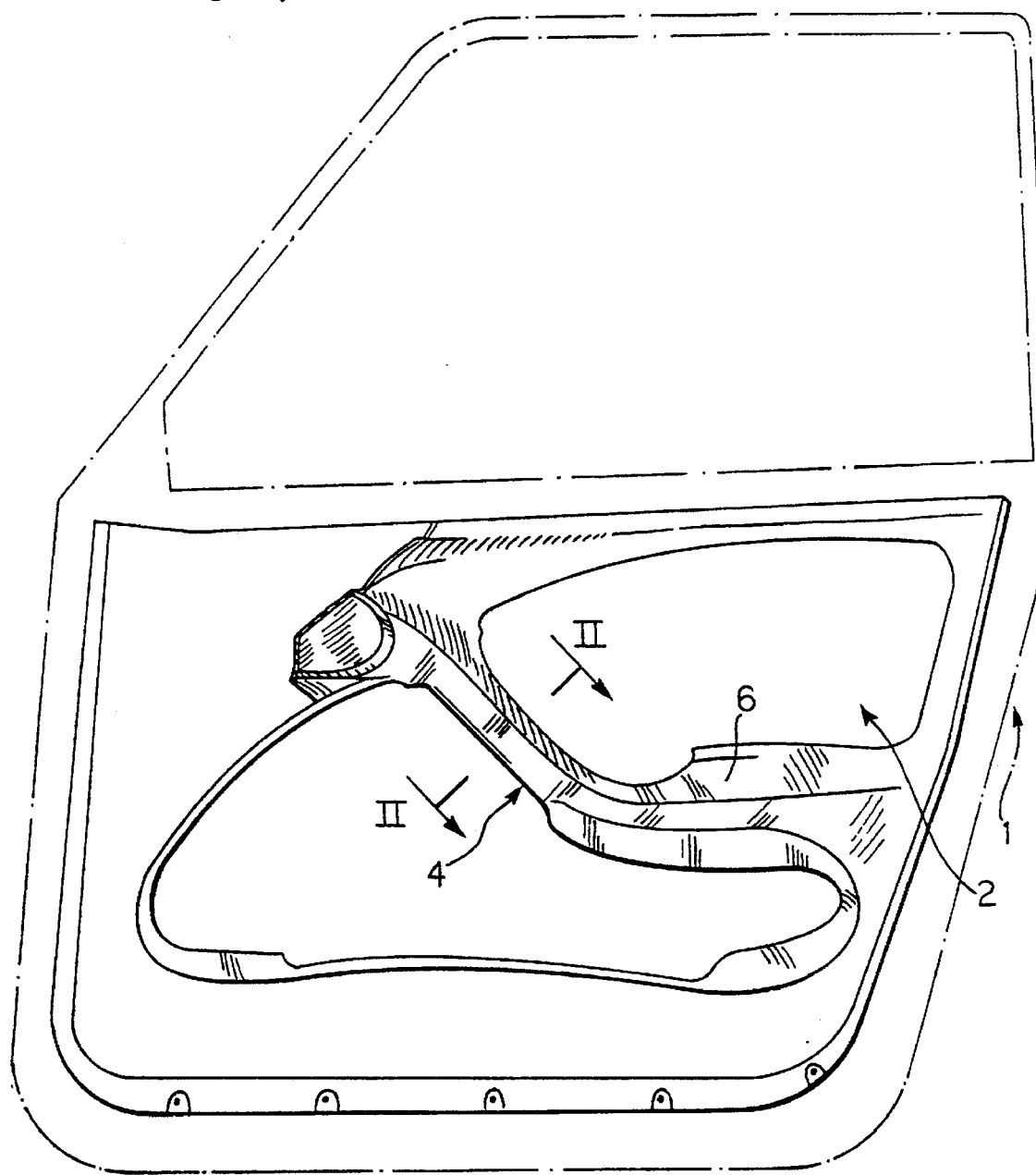
FIG. 1 is a schematic, perspective view of a motor-vehicle door having an article produced by equipment according to the present invention.

With reference to FIG. 1, a motor-vehicle door is indicated 1 and a lining panel 2 with a handle 4, which also forms an armrest 6, is fitted on the inner side thereof. The handle may be constituted by a separate component fixed to the lining panel 2 or may form an integral part thereof.

Figure 2:
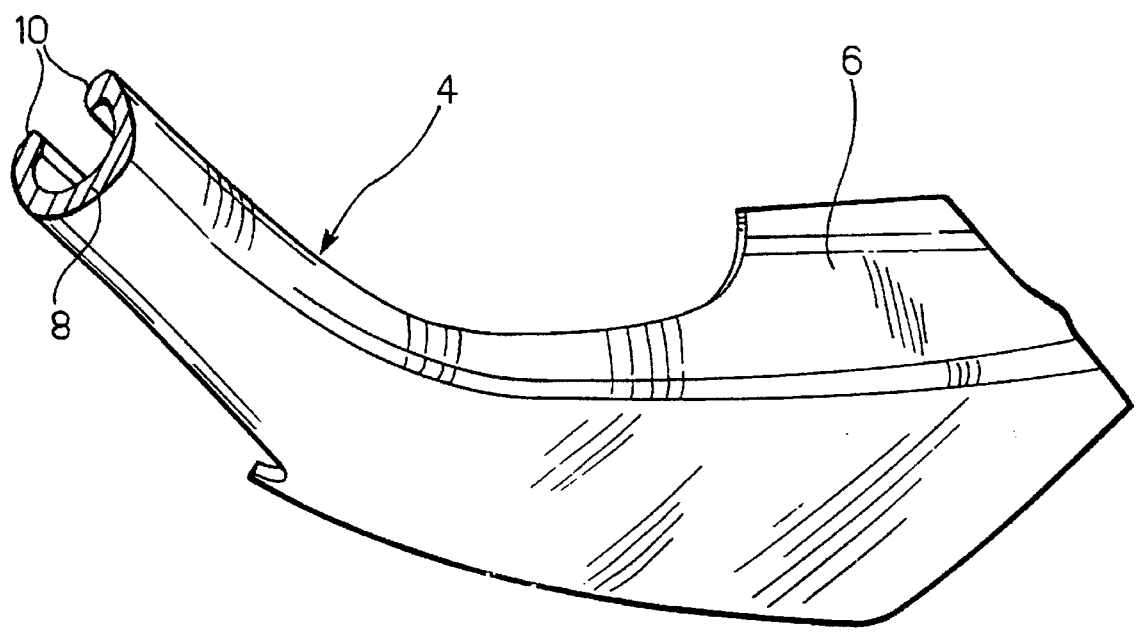
FIG. 2 is a section taken on the line II—II of FIG. 1, FIGS. 3 and 4 are schematic views showing the operation of a first embodiment of equipment according to the invention.

As can be seen in FIG. 2, the handle 4 has an undercut cross-section having a generally channel-shaped configuration with an arcuate portion 8 and two ends 10 which face one another.

Figure 3:
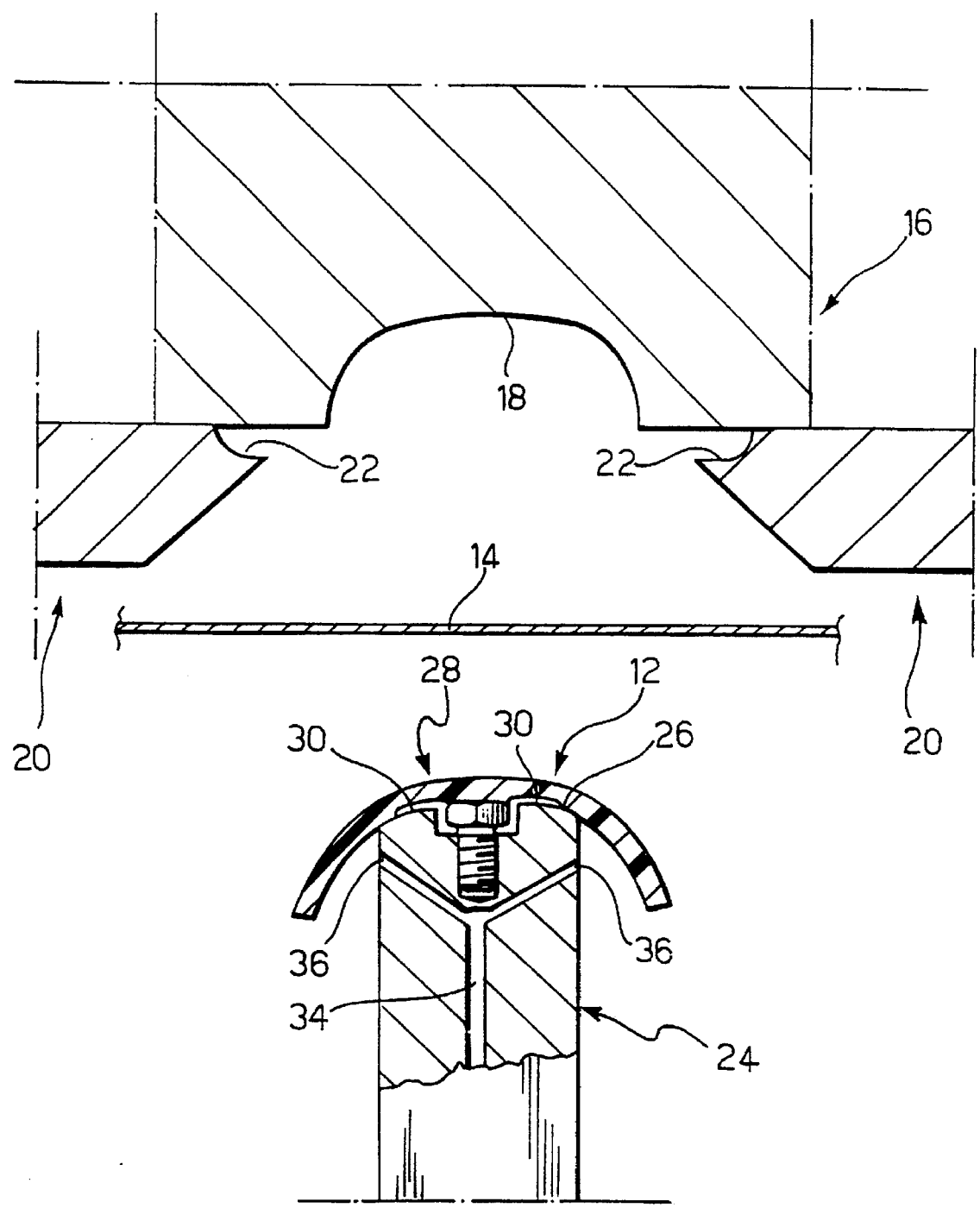
Figure 4:
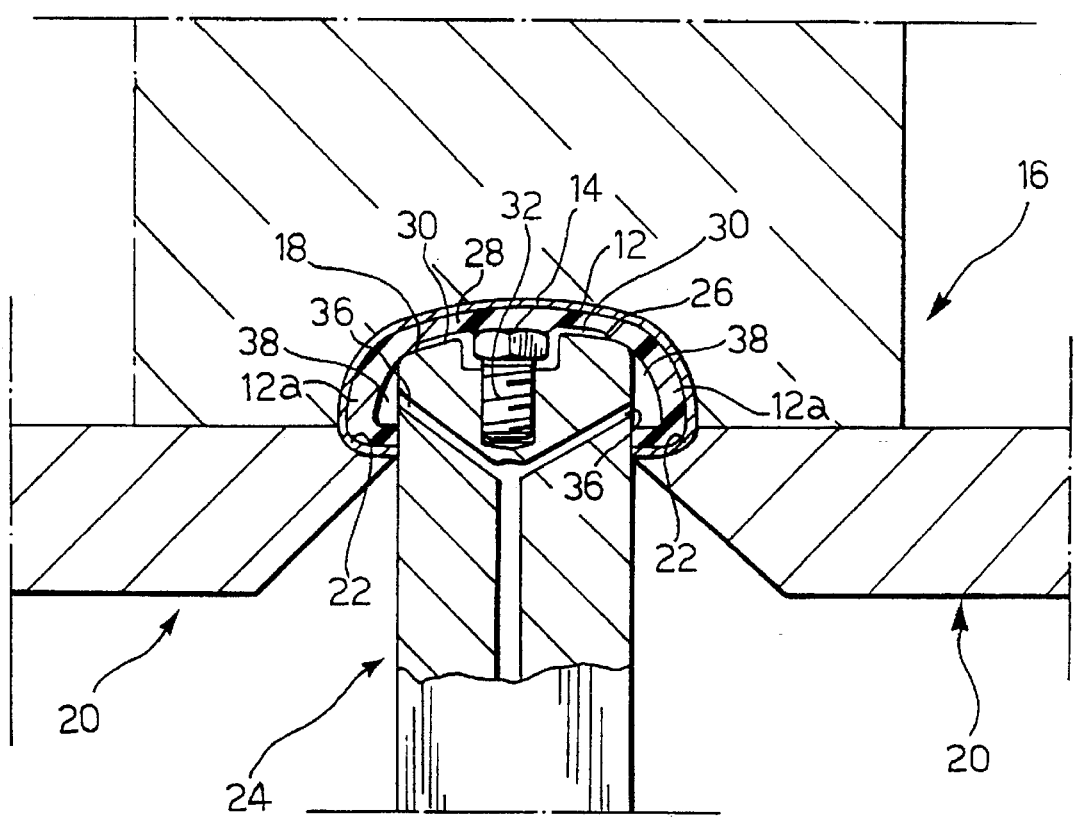

With reference now to FIGS. 3 and 4, the handle is produced by a thermal compression-moulding process, starting with a previously-heated sheet 12 of thermoplastic material to the outer surface of which an aesthetic covering 14 is applied. A first moulding element, indicated 76, has a working surface 18 of a shape corresponding to that of the arcuate-profiled portion 8 of the handle 4. Two sliders, indicated 20, are movable between the inoperative positions of FIG. 3 and the operative positions of FIG. 4 and have respective working surfaces 22 which, in the operative positions of FIG. 4, are connected to the working surface 18 of the first moulding element 16.

The equipment also comprises 0 second moulding element 24 which is movable relative to the first moulding element 16 between the two operative positions shown in FIGS. 3 and 4. The second moulding element 24 has a shaping surface 26 which is intended to be urged against a portion of the inner surface of the sheet 12. The shaping surface 26 of the moulding element 24 has one or more seats for housing respective fixing members 28 each constituted by a metal plate having fixing appendages 30 to which a screw 32 is fixed.

A duct 34 in the second moulding element 24 is connected to a compressed-air source (not shown). The duct 34 communicates with a series of holes 36 in the outer surface of the element 24, near its upper end.

The sheet 12 of thermoplastic material is supported in a semi-plastic state on top of the second moulding element 24, after the fixing members 28 have been positioned in the respective seats. The sheet 14 of covering material is kept extended above the sheet 12. The second moulding element 24 is then brought alongside the first element 16 so as to bring the sheet 12 towards the surface 18 of the first moulding clement 16. The covering sheet 14 thus remains interposed between the working surface 18 and the outer surface of the sheet.

The two sliders 20 are then brought to their operative configurations shown in FIG. 4. In this configuration, the sliders 20 define two cavities 38 with undercut cross-sections, each of which encloses a portion 12a of the sheet 12, a corresponding portion of the covering 34, as well as a hole 36 for the supply of compressed air. As the sliders 20 move from the positions of FIG. 3 to those of FIG. 4, they bond the ends of the sheet 12 towards one another. The handle 4 is formed by the supply of a powerful jet of compressed air into the region 38, by means of the duct 34 and the holes 36, so as to press the heated thermoplastic sheet 12 against the shaping surfaces 18 and 22 of the first moulding element and of the sliders 20. The second moulding element 24 simultaneously exerts pressure on the inner surface of the sheet 12 so as to insert the anchoring appendages 30 of the fixing member 28 in the body of the sheet 12.

The jet of compressed air enables the desired undercut cross-section of the handle 4 to be produced without the need to exert the necessary shaping pressure on the inner surface of the sheet with mechanical members, thus avoiding excessive complexity of the moulding equipment. The finished component is removed simply by returning the sliders 20 to their positions of FIG. 3 and by moving the second moulding element 24 away from the first moulding element 16. When the sheet has cooled, the covering 14 is fixed firmly to the outer surface of the sheet and the fixing member or members 28 remain anchored to the inner surface of the sheet 12. The fixing members 28 will serve to fix the handle to the lining panel 2 but the fixing members are not intended to be applied if the handle is formed integrally with the lining panel.

Figure 5:
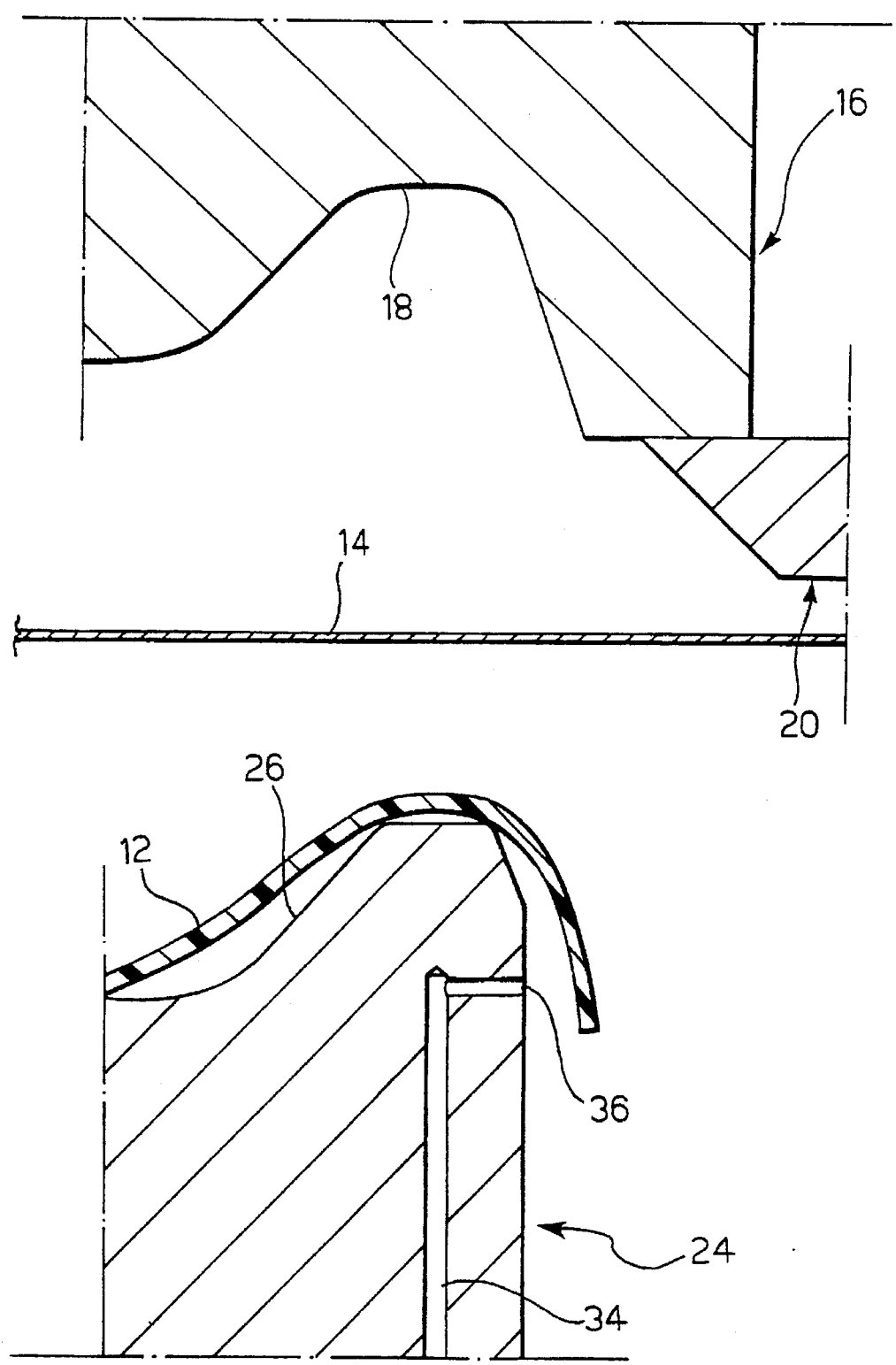
FIGS. 5 and 6 are schematic views showing the operation of a second embodiment of the equipment according to the invention.
Figure 6:
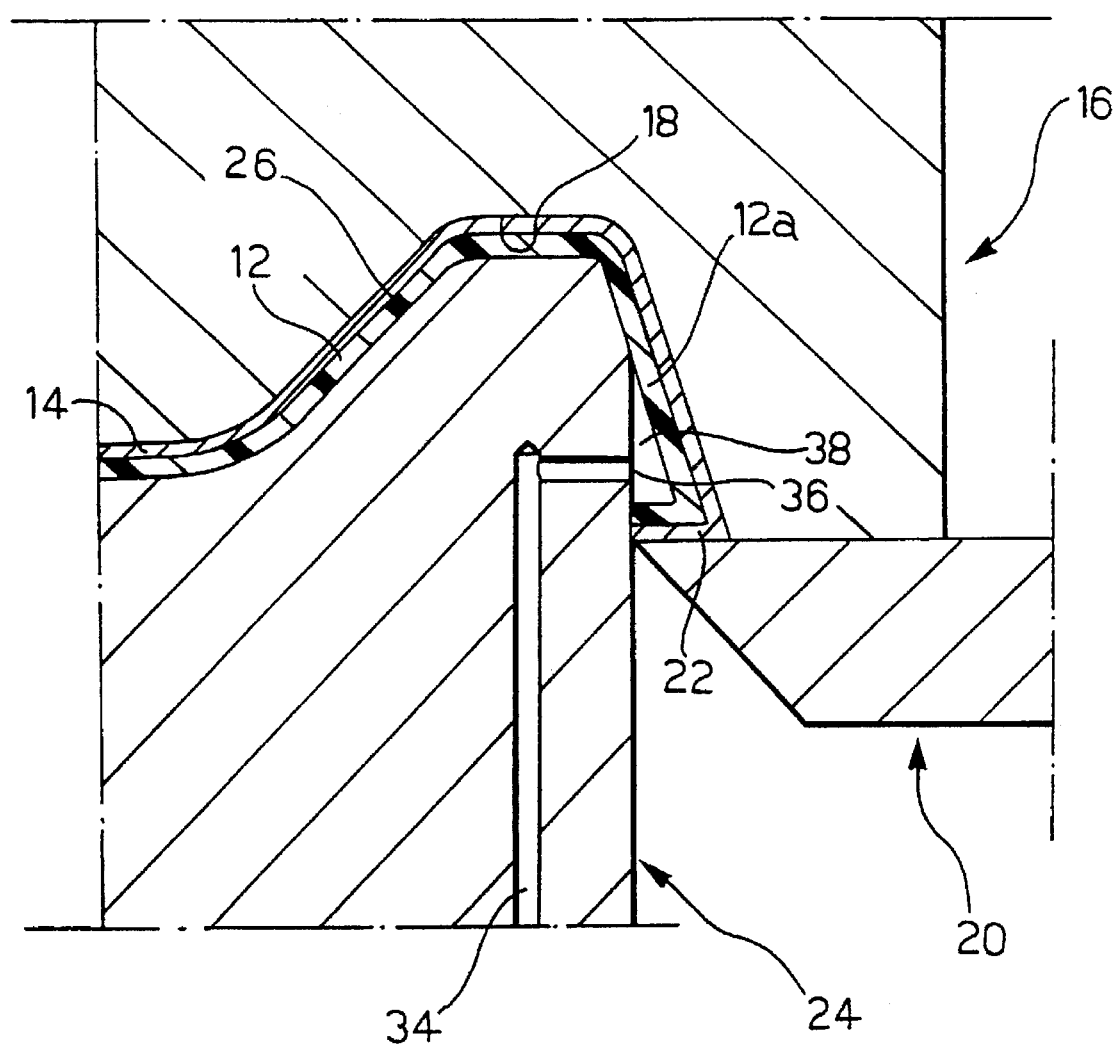

The technology described above is also particularly advantageous for forming an upset edge along the perimeter of the lining panel 2. As shown in FIGS. 5 and 6, in which elements corresponding to those described above are indicated by the same reference numerals, the slider 20 is movable between the operative position of FIG. 5 and the operative position of FIG. 6 in a direction perpendicular to that in which the two moulding elements 16 and 24 are closed.

In the position of FIG. 5, the slider 20 defines a cavity 38 which encloses a perimetral portion 12a of the sheet and the hole 36 for supplying the jet of compressed air which presses the portion of the sheet 12 against the shaping surfaces 22 and 18 of the slider 20 and of the moulding element 16.

By providing several sliders along the sides of the equipment it is possible to produce an upset edge along the entire perimeter of the panel 2 with simple and cheap moulding equipment.

What is claimed is:

1. Equipment for producing a component made of a thermoplastic material and having an undercut cross-section, particularly a handle for motor-vehicle doors, comprising:

a first moulding element having a working surface the shape of which corresponds to a portion of an outer surface of the component when completed;

a second moulding element having a shaping surface which, in a moulding operation, is movable toward said first moulding element for moulding a sheet of said thermoplastic material between said first and second moulding elements;

at least one of slider disposed in sliding engagement with the first moulding element and defining a cavity having a work shaping surface, said slider being movable from an inoperative position wherein the cavity is spaced from the working surface of the first moulding element, to an operative position to engage an edge portion of said sheet of thermoplastic material wherein the surface of the cavity forms a continuation of said working surface of said first moulding element; and a compressed-air supply means carried by the second moulding element, for directing jets of compressed air against said edge of the sheet of thermoplastic material to deform said edge and force said edge into the cavity to provide an undercut cross-section to the component upon completion of said moulding operation.

2. Equipment according to claim 1, wherein a pair of sliders are disposed in opposed sliding engagement with said first moulding element for movement between an inoperative position and an operative position for engaging opposite edges of the thermoplastic sheet.

3. Equipment according to claim 2, wherein each slider has a cavity defining the work shaping surface which is a continuation of said working surface of said first moulding element in said operative position, whereby said compressed air supply means can direct jets of compressed air against said edges to deform said edges and force said edges into said cavities to provide undercut cross-sections to said component.

4. Equipment according to claim 1, wherein the second moulding element has a seat for housing a fixing member which is anchored to the inner surface of the thermoplastic material sheet during the shaping thereof.

* * * * *